Jan. 23, 1962    F. M. JORDAN ETAL    3,017,735
GRASS SEED HARVESTER
Filed Sept. 23, 1959    2 Sheets-Sheet 1

INVENTORS.
Francis M. Jordan
Lawrence M. Jordan
BY
Hovey, Schmidt, Johnson & Hovey
ATTORNEYS.

INVENTORS.
Francis M. Jordan
BY Lawrence M. Jordan

ATTORNEYS

United States Patent Office 3,017,735
Patented Jan. 23, 1962

3,017,735
GRASS SEED HARVESTER
Francis M. Jordan and Lawrence M. Jordan,
Pritchett, Colo.
Filed Sept. 28, 1959, Ser. No. 842,667
3 Claims. (Cl. 56—128)

This invention relates to the harvesting of grass seed such as buffalo grass, wherein particular difficulty is presented because of the close proximity to the ground of the seed, the primary object being to provide an attachment for a harvester such as a combine, which attachment is adapted to pick up the crop and deposit it into a receiving hopper of the combine for thrashing thereby.

It is the most important object of the present invention to provide a crop pickup attachment for combines that is particularly adapted to lift and collect short crops without, at the same time, collecting a large amount of dirt and other debris, but at the same time leaving the field clean insofar as removing substantially all of the crop is concerned.

Another important object of the present invention is to provide an attachment of the aforementioned nature that is not only fully adjustable for operating close to the ground, but which will rise and fall automatically regardless of unevenness of the terrain so that substantially the entire crop is picked up without, at the same time, unduly digging into the ground.

A further important object of the present invention is to provide a grass seed pickup attachment that is substantially self-cleaning in that the crop itself is deposited into an open top hopper of the combine upon which the attachment is mounted, while at the same time, a substantial amount of dirt, trash, and other unwanted materials fall back to the ground ahead of the combine hopper.

Still another very important object of the instant invention relates to the way in which a rotatable pickup broom or brush is supported through the medium of ground-engaging shoes and a hinge arrangement strategically positioned to cause the brush to rise and fall properly in accordance with changes in terrain.

Other objects include important details of construction such as the way in which the brush is adjusted, both vertically and fore and aft with respect to end bands that support the brush through the aforementioned shoes; the manner of attaching the bands to the combine hopper through the aforementioned hinges, as well as through springs that resiliently support the brush assembly under certain terrain conditions; and the manner of confining the crop as it is picked up within a hood assembly as the brush is caused to rotate in a direction opposite to the direction of rotation of the ground-engaging wheels of the combine.

Figure 1:
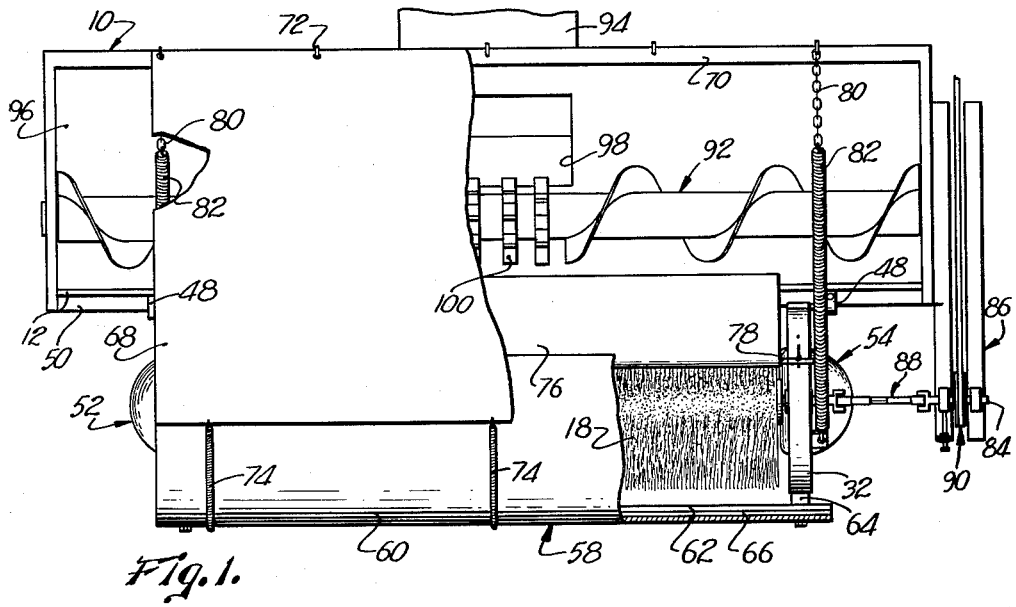
FIG. 1 is a top plan view of a grass seed harvester made pursuant to our present invention showing the same attached to the hopper of a combine, parts being broken away for clearness.

The grass seed harvester forming the subject matter of the instant invention takes the form of an attachment for combines; therefore, there is illustrated in the drawings an open top hopper 10 forming a part of a combine at the front thereof, and which needs a little alteration when the pickup attachment is mounted thereon other than perhaps the closing of the front of the hopper 10 with an upstanding panel 12 extending between the ends 14 and 16 of the hopper 10.

An elongated, cylindrical brush 18, having wire or other strong fiber bristles, is disposed forwardly of the hopper 10 and supported by its axle 20 through the medium of bearing blocks at the ends of the brush 18, one of such blocks being shown in FIGS. 2–5 and designated by the numeral 22.

Figure 2:
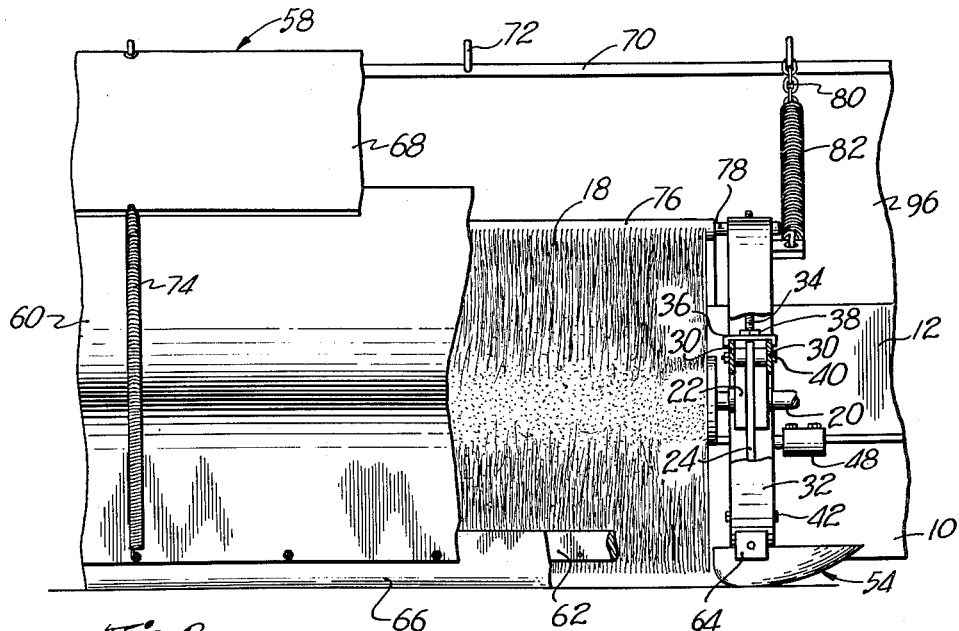
FIG. 2 is a fragmentary, front elevational view thereof, parts being broken away to reveal details of construction.

Block 22 is reciprocable vertically between a pair of uprights 24 fitted within vertical grooves 26 in the block 22. Spaced uprights 24 are disposed between a pair of horizontal bars 28 (FIG. 4) at the lower ends of the uprights 24, and between a pair of upper bars 30 (FIG. 2). Bars 28 and 30 are welded or otherwise affixed to an annular band 32, it being understood of course, at this juncture, that a band 32 is provided at each end respectively of the brush 18.

Blocks 22 are suspended by bolts 34 from caps 36 overlying the bars 30 and slidable therealong during fore and aft adjustment of the brush 18 as about to be described. Adjustment of nuts 38 on the bolts 34 raises and lowers the brush 18 with respect to bands 32 as blocks 22 slide vertically between the uprights 24.

Bolts 40 and 42 connect uprights 24 with bars 28 and 30, such bars being provided with series of openings 44 and 46 to permit fore and aft adjustment of the brush 18 with respect to bands 32.

Hinge means 48 is provided on each band 32 for attaching the same to the hopper 10 for vertical swinging movement, the hinge means 48 each being attached to a horizontal bar 50 forming a part of the hopper 10 and extending along the front thereof.

Bands 32 are additionally supported by ground-engaging shoes 52 and 54, each of which is concavo-convex except only that the inner ends of the shoes 52 and 54 are cut away to clear the brush 18 and turn upwardly into a straight flange 56 that extends fore and aft. Bands 32 fit into the concave faces of the shoes 52 and 54 and are welded or otherwise rigidly attached thereto.

A hood, broadly designated by the numeral 58, covers hopper 10 and brush 18 and extends downwardly in front of the latter. Hood 58 includes a front, arcuate section 60 spaced forwardly of the brush 18 and extending upwardly and rearwardly thereover, resting loosely upon the bands 32. The lower horizontal leading edge of the marginal edge of the hood section 60 is attached to a horizontal crossbar 62 which is in turn carried by brackets 64 extending forwardly of the bands 32 to which brackets 64 are welded adjacent the corresponding shoes 52 and 54. An elongated strip 66 of resilient material is interposed between hood section 60 and bar 62 and depends therefrom.

A flat section 68 forming a part of the hood 58 is secured to uppermost longitudinal edge 70 of hopper 10 as by use of hooks 72. Hood section 68 extends downwardly and forwardly at an angle from the hooks 72 into overlapping relationship to the hood section 60. Hood section 68 is held in place with respect to hood section 60 by a plurality of springs 74 exteriorly of hood section 60 and interconnecting the lower forwardmost edge of the hood section 68 with the bar 62.

Therefore, as the shoes 52 and 54 rise and fall in response to uneven terrain, and the bands 32 swing about the hinges 48, the hood sections 60 and 68 shift relatively as hood section 68 swings vertically about hooks 72 and as the springs 74 hold the hood section 60 against the bands 32 adjacent the tops thereof.

A panel 76 coextensive in length with brush 18, rests loosely upon the upper edge of the panel 12 and swings freely with respect to bands 32 as the latter rise and fall because of a hinge connection between panel 76 and the bands 32. This includes a rod 78 that interconnects the bands 32 and about which the uppermost and forwardmost longitudinal edge of the panel 76 is coiled.

Each band 32 is connected with the upper edge 70 of hopper 10 by a chain 80 which limits the extent of downward swinging movement of the bands 32 with respect to the hopper 10. However, a spring 82 interconnects each band 32 with one of the links of the corresponding chain 80. Consequently, when the terrain is such that the bands 32 and, therefore, brush 18, are not fully supported by the shoes 52 and 54, there is presented a resilient support in the springs 82 and no undue stretching of the springs 82 is possible because of the safety factory provided in the chains 80.

Figure 3:
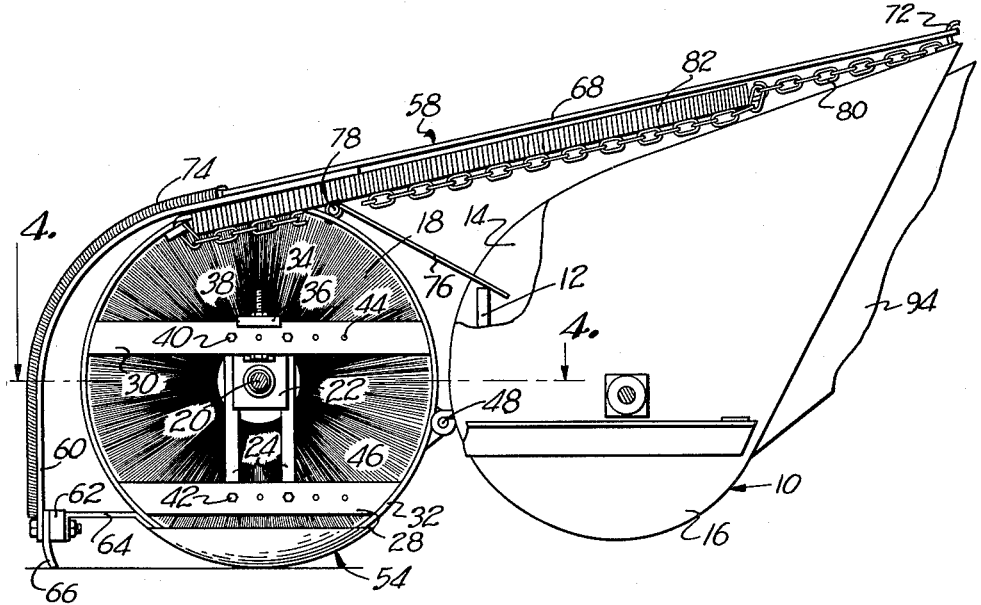
FIG. 3 is a vertical, cross-sectional view through the attachment but showing the combine hopper in end elevation.

The brush 18 is driven clockwise, viewing FIG. 3, in any suitable manner, it being understood that such direction of rotation of the brush 18 is counter to the direction of rotation of the wheels of the combine.

In FIG. 1 of the drawings, a stub shaft 84 is shown supported by suitable framework 86 that may be mounted on the hopper 10 or other structural parts of the combine. Shaft 84 is in turn connected with the axle 20 of brush 18 by a coupling 88 including suitable universal joints and extensible shaft means properly splined together as illustrated. Belt and pulley means 90 serve to drive the shaft 84 from any desired power connection with the combine. The manner in which this result is accomplished forms no part of the present invention and has, therefore, not been illustrated. In this connection, a separate prime mover may be mounted on the combine serving, if desired, solely as the means of driving the brush 18 in the direction above mentioned.

Brush 18 is caused to rotate continuously during operation and, by virtue of its close proximity to the ground, as best seen in FIGS. 2 and 3, the crop is picked up and carried upwardly and forwardly between the brush 18 and the hood section 60. The crop then passes over the brush 18 and is directed rearwardly beneath the hood section 68 above the panel 76 and into the open top of hopper 10.

Auger means 92 conventionally provided within hoppers 10 of combines, gather the crop inwardly and feed the same into intake conduit 94 of the combine, which conduit communicates with the hopper 10 at rear wall 96 thereof in an inlet 98. Resilient flaps 100 forming a part of the conveyor means 92, assists in directing the crop through the inlet 98 and into the conduit 94 where the crop is conveyed to a point of thrashing within the combine in a well known manner.

The direction of rotation of the brush 18 is highly important first because it assures collecting all of the removed crop and effectively depositing it into the hopper 10. This is to be distinguished from an operation wherein the brush 18 would be caused to rotate anticlockwise, viewing FIG. 3, and under such circumstances the crop that is torn loose by the brush 18 would tend to fall in front of hopper 10 and therebeneath rather than be deposited into the hopper 10 as is, of course, desired.

Furthermore, when brush 18 is rotated in the direction above described, dirt and other debris is free to fall out of the crop as it passes over the brush 18 rather than be deposited into the hopper 10 as would be the case if an attempt were made to rotate the brush 18 in an anticlockwise direction.

Figure 4:
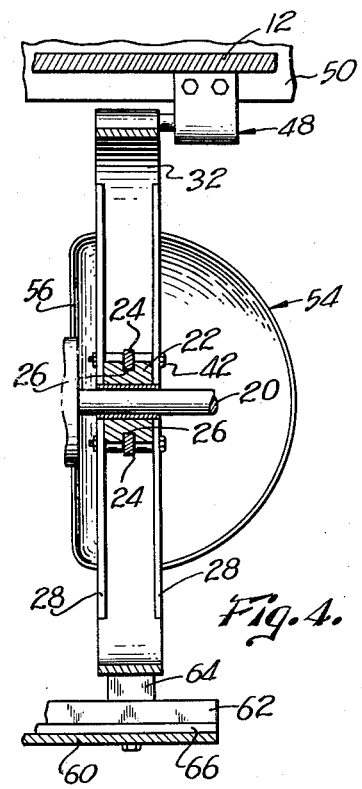
FIG. 4 is an enlarged, fragmentary, cross-sectional view taken on line 4—4 of FIG. 3.
Figure 5:
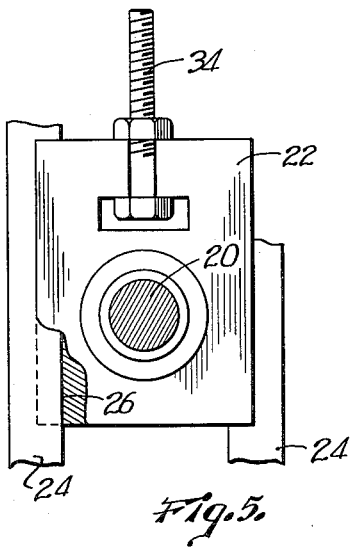
FIG. 5 is an enlarged, fragmentary, detailed elevational view of the means at one end of the pickup brush for adjusting the latter vertically.

The lowermost convex ground-engaging surfaces of the shoes 52 and 54 cause the same to adequately support the brush 18 virtually at all times, regardless of the extent of swinging movement about the hinges 48, all because of the relationship of such surfaces to the hinges 48 as is quite apparent from inspection of FIGS. 3 and 4.

When the hopper 10 of the combine is raised, springs 82 lift the shoes 52 and 54 off the ground, but during transport the chains 80 limit the extent of downward movement of the brush 18 with respect to hopper 10.

Having thus described the invention what is claimed as new and desired to be secured by Letters Patent is:

1. For use with a grass seed pickup having an elongated, cylindrical brush provided with a longitudinally extending axle thereon and adapted to be operably coupled with a movable combine having an elongated, forwardly projecting, open top, walled hopper disposed thereon transverse to the direction of motion thereof, the improvement of which comprises means for rotatably mounting said axle on said combine forwardly of said hopper and comprising a pair of annular bands mounted on the front wall of said hopper in horizontally spaced relationship for swinging movement about horizontal axes, a pair of spaced, horizontally disposed bars for each band and secured thereto at opposed ends thereon, a pair of spaced uprights secured to the bars of each band, a bearing block positioned between and slidably mounted on each pair of said uprights for movement along a substantially vertical path between the corresponding bars, and screw means on the block and one of said corresponding bars for adjustably positioning said block on said uprights, each of said blocks being provided with a central opening therethrough, said blocks being adapted to receive within the openings thereof the ends of said axle for journaling the latter for rotation about a horizontal axis.

2. The invention of claim 1, wherein the ends of said uprights are adjustably secured to the corresponding bars to permit said block and thereby said axle to be shifted longitudinally of said bars toward and away from the interconnection of said bands with said hopper, and wherein is included a substantially concavo-convex shoe for each band, said shoe being secured to and substantially complementally engageable with the respective band at the concave surface thereof, the convex surfaces of said shoes being engageable with the ground when said bands are swingably mounted on said hopper.

3. The invention of claim 1, and wherein is included structure for directing grass seed picked up by said brush into said hopper through the open top thereof, said structure comprising a hood having a first, arcuate section connected to said bands proximal to the lowermost portions thereof and supported at the uppermost portions of said bands to dispose said section in outwardly spaced relationship to said brush, and a flat section having one extremity resting on and substantially overlapping said arcuate section proximal to the uppermost portion of said bands, said flat section adapted to be swingably mounted at the opposite extremity thereof to the rear wall of said hopper to permit said bands to swing about the axes thereof and to maintain the spacing between said arcuate section and said brush.

References Cited in the file of this patent

UNITED STATES PATENTS

| | | |
|---|---|---|
| 1,370,919 | Schaefer | Mar. 8, 1921 |
| 1,842,737 | Tharp | Jan. 26, 1932 |
| 2,526,141 | Knowlton | Oct. 17, 1950 |
| 2,699,637 | Nisbet | Jan. 18, 1955 |
| 2,853,845 | Smith | Sept. 30, 1958 |